United States Patent
Andou et al.

(10) Patent No.: US 8,760,279 B2
(45) Date of Patent: Jun. 24, 2014

(54) AIR PRESSURE INFORMATION DISPLAY SYSTEM OF VEHICLE TIRE

(75) Inventors: Fumitaka Andou, Hiroshima-ken (JP); Kiyoshi Sakamoto, Chiba-ken (JP)

(73) Assignee: Mazda Motor Corporation, Hiroshima (JP)

( * ) Notice: Subject to any disclaimer, the term of this patent is extended or adjusted under 35 U.S.C. 154(b) by 1074 days.

(21) Appl. No.: 10/309,326

(22) Filed: Dec. 4, 2002

(65) Prior Publication Data

US 2003/0128109 A1    Jul. 10, 2003

(30) Foreign Application Priority Data

Dec. 4, 2001  (JP) .................................. 2001-369795

(51) Int. Cl.
    *B60C 23/00*    (2006.01)
(52) U.S. Cl.
    USPC ............ 340/447; 340/444; 340/445; 340/635
(58) Field of Classification Search
    USPC ......... 340/447, 444, 445, 635, 446, 442, 448, 340/443, 539.11, 539.1; 73/146.5, 146.2
    See application file for complete search history.

(56) References Cited

U.S. PATENT DOCUMENTS

| | | | |
|---|---|---|---|
| 6,407,661 B2 * | 6/2002 | Arita et al. | 340/444 |
| 6,441,728 B1 * | 8/2002 | Dixit et al. | 340/447 |
| 6,441,732 B1 | 8/2002 | Laitsaari et al. | |
| 6,476,712 B1 * | 11/2002 | Achterholt | 340/447 |
| 6,505,507 B1 | 1/2003 | Imao et al. | |
| 6,518,877 B1 * | 2/2003 | Starkey et al. | 340/447 |
| 6,581,449 B1 * | 6/2003 | Brown et al. | 73/146 |
| 6,612,165 B2 * | 9/2003 | Juzswik et al. | 73/146.5 |
| 6,825,758 B1 | 11/2004 | Laitsaari | |
| 6,853,745 B1 | 2/2005 | Jacobs et al. | |
| 2002/0030592 A1 | 3/2002 | Hakanen et al. | |

FOREIGN PATENT DOCUMENTS

| | | |
|---|---|---|
| JP | 10-508264 | 8/1998 |
| JP | 11-110689 | 4/1999 |
| JP | 2001-108551 | 4/2001 |
| JP | 2001-294136 | 10/2001 |
| JP | 2002-131191 | 5/2002 |
| JP | 2002-183728 | 6/2002 |
| JP | 2002-208084 | 7/2002 |
| JP | 2002-216281 | 8/2002 |
| JP | 2004-513855 | 5/2004 |
| WO | WO 96/15919 | 5/1996 |
| WO | WO 02/040394 | 5/2002 |

OTHER PUBLICATIONS

Japanese Patent Office Action, dated Feb. 7, 2006.

* cited by examiner

*Primary Examiner* — Tai T Nguyen

(57) ABSTRACT

In an air pressure information display system of a vehicle tire, a vehicle (1) has air pressure sensors (7-9) for detecting the air pressure of a vehicle tire (2-5), and transmitting air pressure information indicating the detected air pressure via a wireless communication, and an informing unit (100) installed in a gas station or the like has a display module (100*b*) for displaying the received air pressure information.

10 Claims, 15 Drawing Sheets

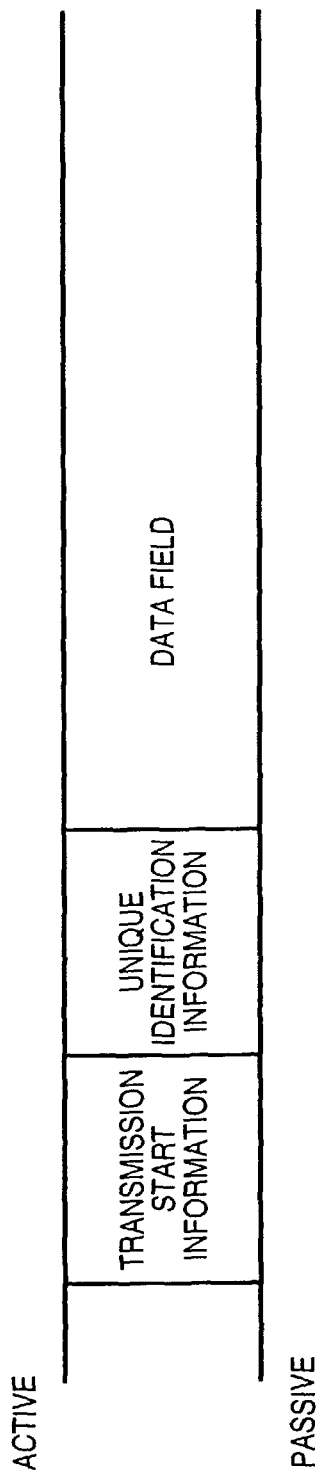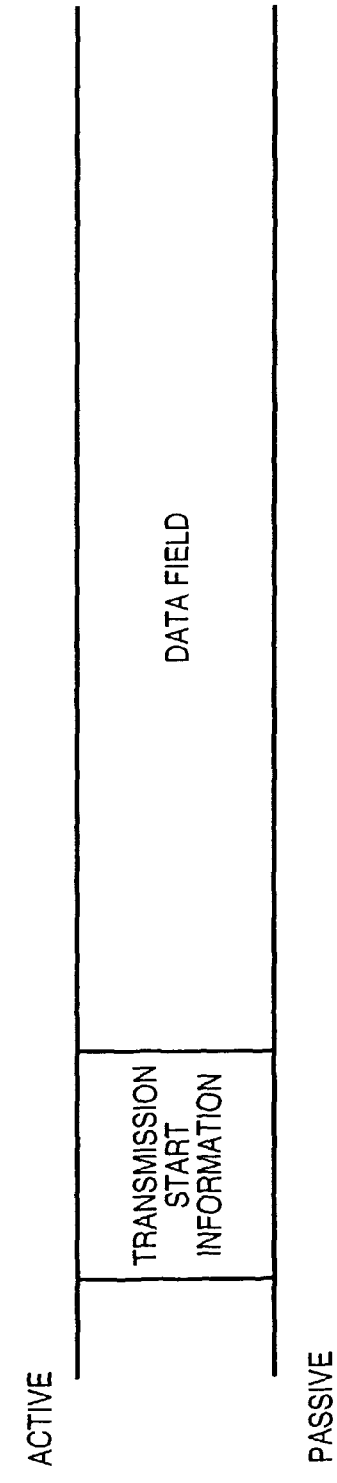

AIR PRESSURE INFORMATION DISPLAY SYSTEM OF VEHICLE TIRE

FIELD OF THE INVENTION

The present invention relates to an air pressure information display system of a vehicle tire and, more particularly, to an air pressure information display system of a vehicle tire, which can provide detailed air pressure information to a user of a vehicle that does not comprise any display that can display air pressure information in a detailed way.

BACKGROUND OF THE INVENTION

Conventionally, a technique for detecting the air pressure of a vehicle tire, and informing the user of the detected air pressure as a tire air pressure state is known.

As such technique, for example, Japanese translation of PCT publication No. 10-508264 discloses a technique that corrects an air pressure signal of a tire detected by a pressure sensor in association with a standard temperature (20°), and displays the corrected air pressure signal on a display of a vehicle.

However, in the above prior art, the tire air pressure state cannot be displayed unless a vehicle comprises a control unit for displaying the tire air pressure state, and a display, and there is room for improvement in display versatility.

That is, even in a vehicle which does not comprise a control unit for displaying the tire air pressure state and a display, when its tires has been changed to those with air pressure sensors, since the air pressure state of the changed tires is detectable, it is demanded to present the air pressure information of the changed tires to the user somehow in that vehicle.

Even when a vehicle comprises a control unit for displaying the tire air pressure state, if a display controlled by that control unit is a simple warning lamp, the tire air pressure state cannot be displayed by means of detailed numerical values. Hence, it is demanded to provide that air pressure state to the user somehow.

SUMMARY OF THE INVENTION

The present invention has been proposed to solve the conventional problems, and has as its object to provide an air pressure information display system of a vehicle tire, which can provide detailed air pressure information to the user of a vehicle that does not comprise any display that can display air pressure information in a detailed way.

In order to achieve the above object, an air pressure information display device of a vehicle tire according to the present invention adopts the following solution.

That is, the first arrangement of the present invention is characterized in that a vehicle (1) comprises air pressure information detection means (7-9) for detecting an air pressure of a vehicle tire (2-5), and transmitting the detected tire air pressure via a wireless communication, and a specific facility which can receive the tire air pressure information detected by the air pressure information detection means comprises display means (100) for displaying the received air pressure information.

According to the first arrangement of the present invention, since the air pressure information is displayed not on the vehicle but on the specific facility such as a gas station or the like, even when the vehicle does not comprise any tire air pressure informing system, and mounts only tires with air pressure sensors, the air pressure information can be provided to the user.

That is, according to the present invention, since the detected air pressure information is displayed not on the vehicle but on the specific facility, that air pressure information can be specifically provided to the user of a vehicle which does not comprise any display that can display air pressure information in a detailed display mode.

The second arrangement of the present invention is characterized in that the vehicle comprises:
vehicle stop state detection means (10b, 200e) for detecting a stop state of the vehicle; and
wireless transmission control means for, when the vehicle stop state detection means detects the stop state of the vehicle, transmitting the air pressure information detected by the air pressure information detection means to the specific facility.

According to the second arrangement of the present invention, since the air pressure information is transmitted from the vehicle to the specific facility via a wireless communication when the vehicle stops, the air pressure information can be provided to the specific facility at a required timing without providing any receiver for receiving a transmission request from the specific facility to the vehicle.

The third arrangement of the present invention is characterized in that the vehicle stop state detection means (200e) detects the stop state of the vehicle when fueling detection means for detecting a fueling state of the vehicle detects that fueling is in progress.

According to the third arrangement of the present invention, since the air pressure information is transmitted from the vehicle to the specific facility via a wireless communication when a stop state of the vehicle is detected by detecting a fueling state such as an open operation of a filler lid, the air pressure information can be provided to the specific facility at a required timing.

The fourth arrangement of the present invention is characterized in that the vehicle stop state detection means (10b) detects the stop state of the vehicle when a change amount of the air pressure detected by the air pressure information detection means (7-9) is detected, and a change in air pressure not less than a predetermined value is detected on the basis of the detected change amount.

In general, when the tire air pressure drops, the user brings the vehicle to a stop, and pumps air in a tire. In this case, a change in tire air pressure becomes large due to the pumped air.

According to the fourth arrangement of the present invention, since a stop state of the vehicle can be detected by detecting this change in tire air pressure, the air pressure information can be provided to the specific facility at a required timing.

The fifth arrangement of the present invention is characterized in that the specific facility comprises:
air pressure information request transmission means (100d) for transmitting, via a wireless communication, an air pressure information transmission request signal used to require the vehicle to transmit the air pressure information, and
the vehicle comprises:
reception means (200g) for receiving the air pressure information transmission request signal from the air pressure information request transmission means; and
wireless transmission control means (200f) for, when the reception means receives the air pressure information transmission request signal from the air pressure information request transmission means, transmitting the air pressure information detected by the air pressure information detection means to the specific facility via a wireless communication.

According to the fifth arrangement of the present invention, when the vehicle receives an air pressure information transmission request signal from the specific facility, it transmits air pressure information to the specific facility via a wireless communication, thus improving the reliability of signal exchange.

The sixth arrangement of the present invention is characterized in that the specific facility comprises:

stop state detection means (100c) for detecting a stop state of the vehicle in the specific facility, and the air pressure information request transmission means transmits the air pressure information transmission request signal to the vehicle when the stop state detection means detects the stop state of the vehicle.

According to the sixth arrangement of the present invention, when the vehicle receives an air pressure information transmission request signal from the specific facility, it transmits air pressure information to the specific facility via a wireless communication, thus improving the reliability of signal exchange.

Also, since the specific facility issues the air pressure information transmission request upon detection of the vehicle stop state, the air pressure information can be provided to the specific facility at a required timing.

The seventh arrangement of the present invention is characterized in that the vehicle (1) comprises:

an air pressure information detection means (7-9) for detecting an air pressure of a vehicle tire (2-5), and transmitting air pressure information indicating the detected tire air pressure via a wireless communication;

informing means (11) for informing an air pressure state of the vehicle tire; and an informing control unit (10) for controlling the informing means to inform the air pressure state of the vehicle tire in the vehicle on the basis of the tire air pressure information received from the air pressure information detection means via a wireless communication, the informing control unit (10) comprises:

normal air pressure storage means (200a) for storing a normal air pressure of the vehicle tire;

excessive/deficient amount calculation means (200b) for calculating information associated with an excessive/deficient amount of the tire air pressure detected by the air pressure information detection means from the normal air pressure on the basis of a relationship between the normal air pressure stored in the normal air pressure storage means and the tire air pressure information detected by the tire air pressure information detection means;

determination means (200c) for determining an air pressure state of the tire on the basis of the information associated with the excessive/deficient amount calculated by the excessive/deficient amount calculation means;

informing control means (200d) for controlling the informing means to inform the tire air pressure state determined by the determination means in a predetermined mode; and wireless transmission means (200f) for transmitting the air pressure information detected by the air pressure information detection means or the information associated with the excessive/deficient amount calculated by the excessive/deficient amount calculation means to a specific facility that can receive the air pressure information or the information associated with the excessive/deficient amount via a wireless communication, and the specific facility comprises:

reception means (100a) that can receive the air pressure information directly transmitted from the air pressure information detection means (7-9) via a wireless communication, the air pressure information transmitted via the wireless transmission means (200f), or the information associated with the excessive/deficient amount transmitted by the wireless transmission means (200f) via a wireless communication; and display means (100b) for displaying the air pressure information or the information associated with the excessive/deficient amount received by the reception means.

According to the seventh arrangement of the present invention, the informing means of the vehicle receives the tire air pressure state information in a predetermined mode. That is, in the vehicle, the user is informed of only whether or not the tire air pressure is normal with respect to the normal air pressure without informing any detailed numerical value information of the tire air pressure. Therefore, since a warning lamp or buzzer need only be added to the vehicle, no expensive display module for displaying detailed numerical values of air pressure information is required, and an increase in vehicle cost can be suppressed.

Upon receiving this information, the user adjusts the tire air pressure at a nearby specific facility such as a gas station or the like. In this case, since the detailed air pressure information is displayed on the specific facility, it can be provided to the user of a vehicle which does not comprise any display means for displaying detailed air pressure information.

The eighth arrangement of the present invention is characterized in that a signal specification of a transmission signal, which is transmitted from the air pressure information detection means (7-9) to the informing control unit (10) via a wireless communication, contains unique identification information used to identify a self vehicle from other vehicles, and a transmission signal, which is transmitted from the informing control unit (10) to the specific facility via a wireless communication, has a common signal specification irrespective of the self vehicle and other vehicles.

Upon receiving the air pressure information from the air pressure information detection means, the informing control unit of the vehicle must identify if that air pressure information is sent from the self vehicle or another vehicle.

Since the specific facility must process air pressure information sent from a plurality of vehicles via wireless communications, if the signal specification of the transmission signal used to receive the air pressure information sent via the wireless communication differs for respective vehicles, the reception processing load on the specific facility becomes heavier.

According to the eighth arrangement of the present invention, since the transmission signal, which is transmitted from the air pressure information detection means to the informing control unit via a wireless communication, is set to have a signal specification including unique identification information used to identify the self vehicle from another vehicle, the informing control unit of the self vehicle can be prevented from erroneously receiving air pressure information from another vehicle as that of the self vehicle.

Also, since the transmission signal which is transmitted from the control unit to the specific facility via a wireless communication is set to have a common signal specification irrespective of the self vehicle or another vehicle, the load on the reception process in the specific facility can be reduced.

The ninth arrangement of the present invention is characterized in that a transmission signal, which is transmitted from the air pressure information detection means or the informing control unit to the specific facility via a wireless communication, contains unique identification information used to identify a vehicle that transmitted the signal via a wireless communication.

According to the ninth arrangement of the present invention, since the transmission signal transmitted from the air pressure information detection means or the informing control unit via a wireless communication contains unique identification information that can identify the source vehicle of that signal, the specific facility can identify the vehicle which transmitted the air pressure information.

The 10th arrangement of the present invention is characterized in that the specific facility comprises verification means (100f) for comparing unique identification information contained in a transmission signal, which is transmitted from the air pressure information detection means or the informing control unit to the specific facility via a wireless communication, with unique identification information prestored in the specific facility or obtained from a system outside the specific facility, and the display means (100b) displays the unique identification information verified by the verification means together with the air pressure information or the information associated with the excessive/deficient amount received by the reception means.

According to the 10th arrangement of the present invention, since the specific facility verifies the vehicle that transmitted the air pressure information on the basis of the unique identification information, and displays the verified unique identification information together with the air pressure information or information associated with an excessive/deficient amount, correspondence between the transmitted air pressure information or information associated with the excessive/deficient amount, and the vehicle which transmitted the information can be recognized.

The 11th arrangement of the present invention is characterized in that the specific facility comprises unique identification means storage means (100e) for storing unique identification information which can identify a vehicle, the air pressure information request transmission means (100d) in the specific facility transmits the unique identification information obtained from the unique identification means storage means to the vehicle together with the air pressure information transmission request signal, and the wireless transmission control means (200f) in the vehicle transmits the air pressure information to the specific facility via a wireless communication when the unique identification information transmitted from the air pressure information request transmission means via a wireless communication matches unique identification information of the self vehicle.

According to the 11th arrangement of the present invention, when the unique identification information transmitted from the air pressure information request transmission means matches that of the self vehicle in the specific facility, the wireless transmission control means transmits the air pressure information to the specific facility. Hence, correspondence between the transmitted air pressure information and the vehicle which transmitted the information can be normally recognized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows the specification of a transmission signal which is transmitted from air pressure sensors 6 to 9 to a control unit 10 in the fifth embodiment;

FIG. 11 shows the specification of a transmission signal which is exchanged between the air pressure sensors 6 to 9 or informing control unit 10, and a gas station 100 in the fifth embodiment;

DETAILED DESCRIPTION OF THE PREFERRED EMBODIMENTS

Preferred embodiments of the present invention will now be described in detail in accordance with the accompanying drawings.

First Embodiment

Figure 1:
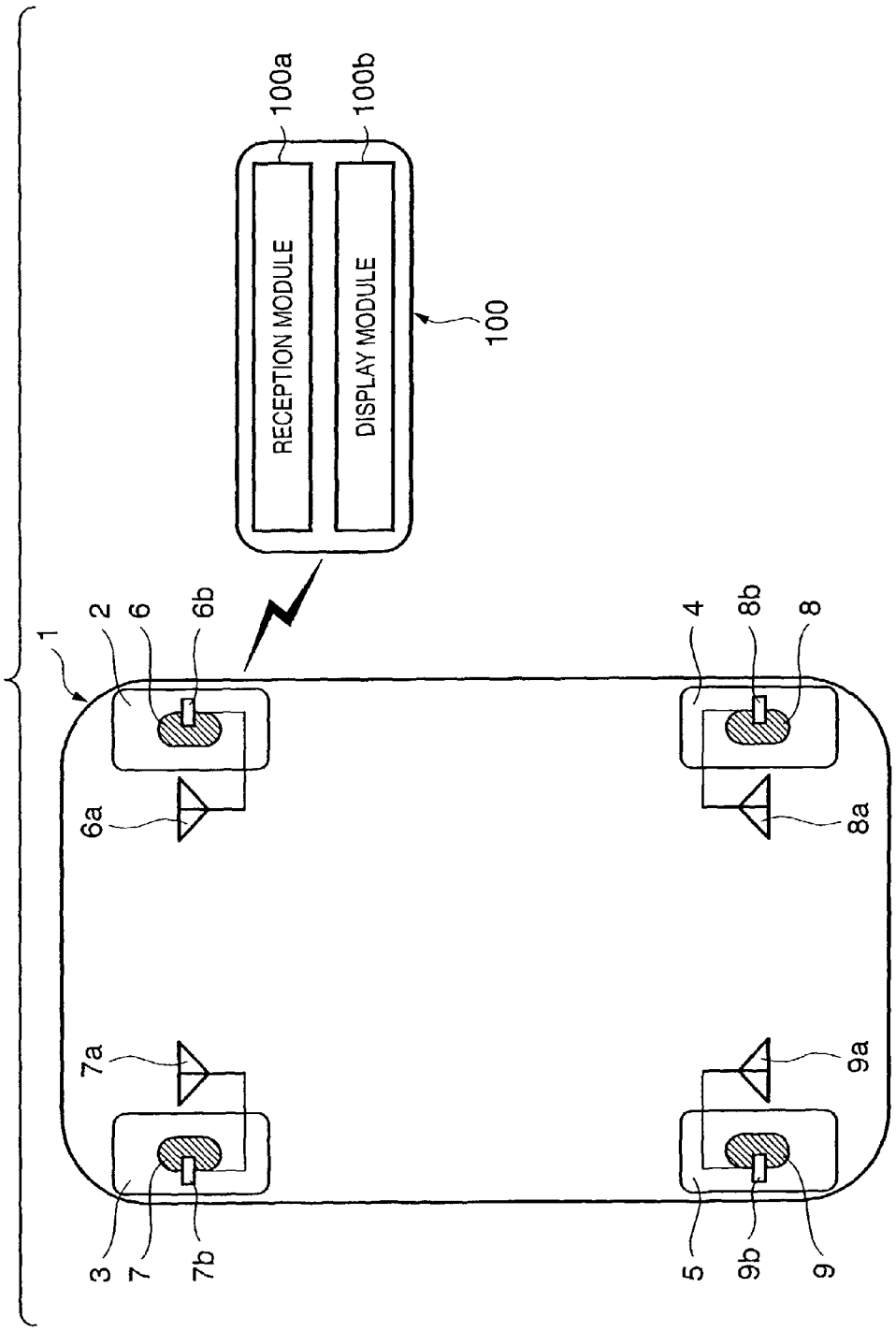
FIG. 1 is a view showing the overall arrangement of an air pressure display system of a vehicle tire according to the first embodiment.

FIG. 1 shows the overall arrangement of an air pressure display system of a vehicle tire according to the first embodiment. Referring to FIG. 1, a vehicle 1 has tires 2 to 5, which respectively comprise air pressure sensors 6 to 9. The air pressure sensors 6 to 9 can detect not only an air pressure but also a tire temperature.

The air pressure sensors 6 to 9 respectively form sensor units which comprise transmitters 6b to 9b and antennas 6a to 9a, and the air pressure (measured air pressure) and tire temperature detected by the air pressure sensors are transmitted to an informing unit installed in a specific facility (e.g., gas station) 100 via a wireless communication.

In this embodiment, the antenna is equipped in correspondence with each air pressure sensor, but data of the respective air pressure sensors may be sent using only one antenna.

An informing unit 100 installed in the specific facility such as a gas station or the like comprises a reception module 100a for receiving the air pressure and tire temperature transmitted from the air pressure sensors 6 to 9 via a wireless communication, and a display module (display unit) 100b for numerically displaying the air pressure received by the reception module 100a on a display.

According to the first embodiment with the aforementioned system arrangement, the air pressure detected by the air pressure sensors 6 to 9 of the vehicle 1 is displayed on the display module 100b of the informing unit 100 installed in the specific facility such as a gas station or the like. Hence, when the user visits such gas station, the air pressure information can be provided as detailed numerical value information even to the user of the vehicle 1 which does not comprise a control unit for informing an air pressure and informing means for acoustically and/or visually informing the air pressure information, as shown in the system arrangement of FIG. 1.

Second Embodiment

Figure 2:
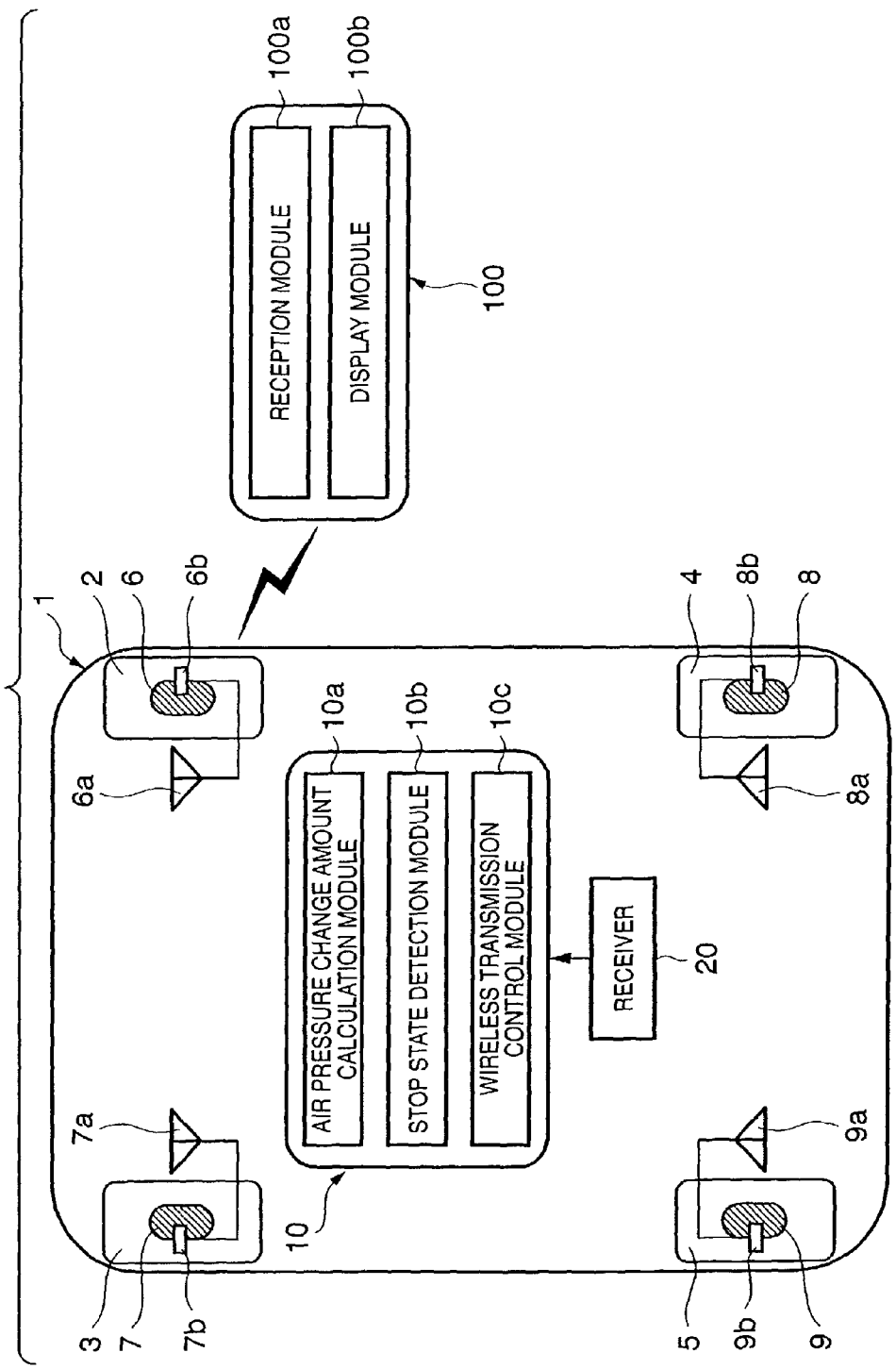
FIG. 2 is a view showing the overall arrangement of an air pressure display system of a vehicle tire according to the second embodiment.

FIG. 2 shows the overall arrangement of an air pressure display system of a vehicle tire according to the second embodiment. Referring to FIG. 2, a vehicle 1 has tires 2 to 5, which respectively comprise air pressure sensors 6 to 9.

The air pressure sensors 6 to 9 respectively form sensor units which comprise transmitters 6b to 9b and antennas 6a to 9a, and the air pressure (measured air pressure) and tire temperature detected by the air pressure sensors are transmitted to a control unit 10 mounted on the vehicle 1 or an informing unit 100 installed in a specific facility (e.g., gas station) via wireless communications.

In the following description, the informing unit 100 installed in the specific facility such as a gas station or the like will also be referred to as "gas station 100" for the sake of convenience.

The control unit 10 implements functions of respective modules to be described below by executing operation instructions of a software program, which is prepared in advance to externally output air pressure information of a vehicle tire, using a CPU (central processing unit; not shown).

Note that the modules are predetermined function units implemented by the software program and hardware, and the control unit 10 shown in FIG. 2 is comprised of:
   an air pressure change amount calculation module 10a for calculating a change amount of an air pressure detected by the air pressure sensors 6 to 9;
   a stop state detection module 10b for detecting a stop state of the vehicle; and
   a wireless transmission control module 10c for, when the stop state detection module 10b detects the stop state of the vehicle, transmitting the air pressure detected by the air pressure sensors 6 to 9 to the gas station 100 via wireless communications.

Also, a receiver 20 which receives radio signals sent from the antennas 6a to 9a of the air pressure sensors 6 to 9 and demodulates them to information in a format that the control unit 10 can read is connected to the control unit 10.

The gas station 100 comprises a reception module 10a for receiving the air pressure and tire temperature transmitted from the air pressure sensors 6 to 9 via a wireless communication, and a display module (display unit) 100b for numerically displaying the air pressure received by the reception module 100a on a display.

The detailed control procedure of the control unit 10 according to the second embodiment will be described below with reference to the flow charts of FIGS. 3 and 4.

Figure 3:
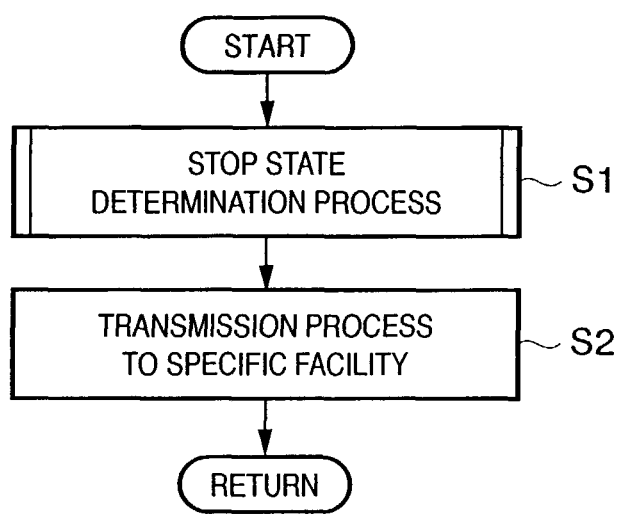
FIG. 3 is a flow chart showing the control procedure of a control unit 10 according to the second embodiment.

In step S1 in FIG. 3, a stop state determination process of the vehicle 1 is executed. If the stop state of the vehicle 1 is determined in step S1, a transmission process for transmitting the air pressure detected by the air pressure sensors 6 to 9 to the gas station 100 is executed in step S2.

The process in step S1 in FIG. 3 will be described in detail below with reference to the flow chart of FIG. 4.

In step S10, the control unit 10 reads various signals indicating the state of a manual switch used to identify the vehicle stop state, the state of a filler switch used to detect the open/close state of a filler cap (filler lid), the state of an ignition switch, the detection result of a wheel speed sensor (none of them are shown), the air pressure change amount calculated by the air pressure change amount calculation module 10a, and the like.

It is then checked in subsequent steps S11 to S15 if the vehicle 1 is making a stop or running.

It is checked in step S11 based on the signal read in step S10 if the manual switch is ON. This manual switch is equipped in the vehicle 1, and is used by the user to make the control unit 10 recognize the vehicle stop state.

If YES in step S11, since the manual switch is ON, the flow jumps to step S16. And, it is determined in step S16 that the vehicle 1 is in the stop state.

On the other hand, if NO In step S11, the flow advances to step S12 to check if the filler switch detects an open state. If YES in S12, since it is determined that the vehicle 1 is being fueled, and is making a stop, the flow jumps to step S16. And, it is determined in step S16 that the vehicle 1 is in the stop state.

If NO in step S12, the flow advances to step S13 to check if the air pressure change amount is equal to or larger than a predetermined value. If YES in step S13, since it is determined that the vehicle is making a stop to pump air in a tire, the flow jumps to step S16. And, it is determined in step S16 that the vehicle 1 is in the stop state.

If NO in step S13, the flow advances to step S14 to check if the ignition switch is OFF. If YES in step S14, since it is determined that the ignition switch is OFF and the vehicle 1 is making a stop, the flow jumps to step S16. And, it is determined in step S16 that the vehicle 1 is in the stop state.

If NO in step S14, the flow advances to step S15 to check if the wheel speed is not detected. If YES in step S15, since the vehicle 1 is making a stop and no wheel speed is detected, the flow advances to step S16. And, it is determined in step S16 that the vehicle 1 is in the stop state.

If NO in all of steps S11 to S15, it is determined in step S17 that the vehicle 1 is running.

Figure 4:
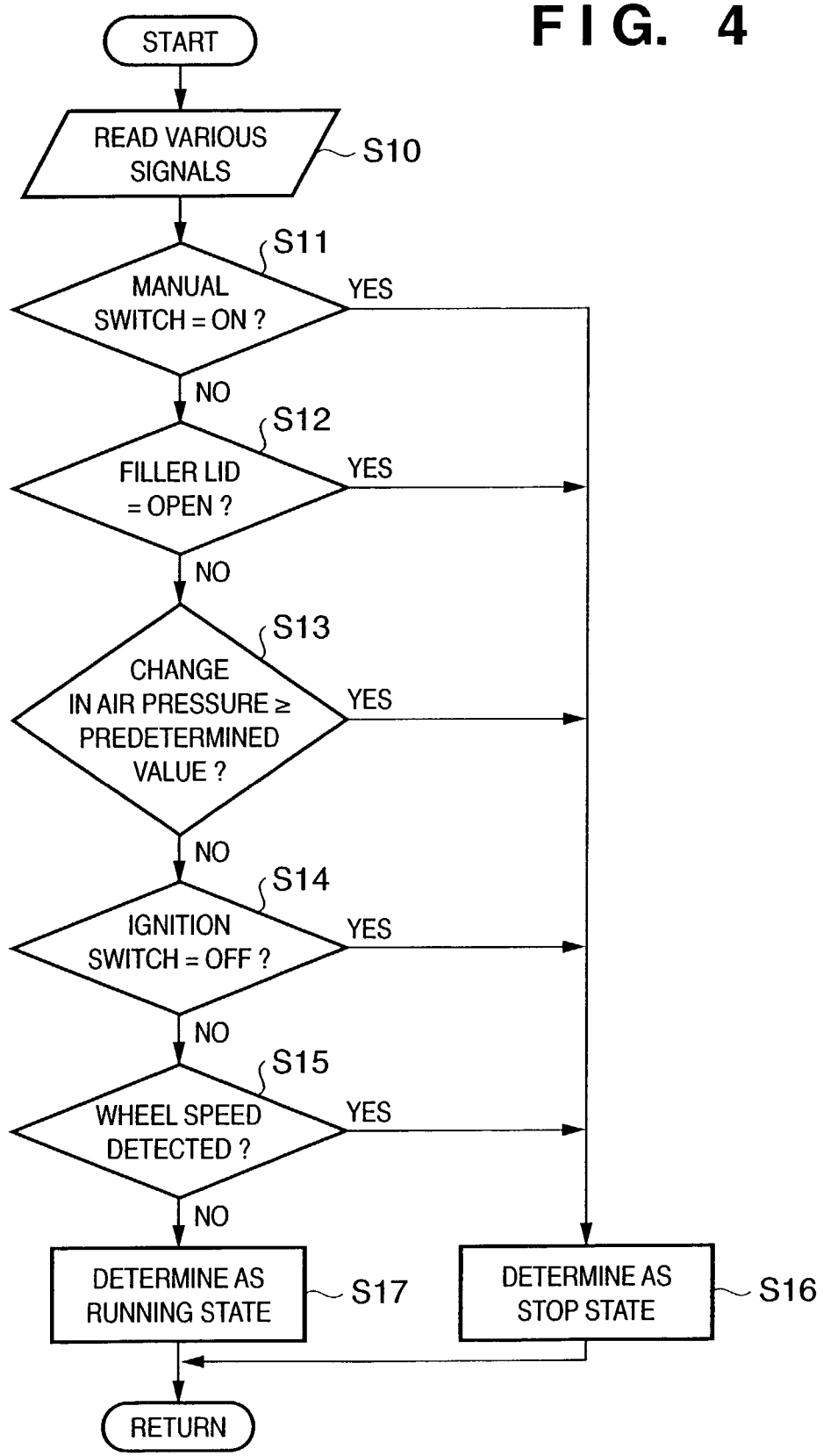
FIG. 4 is a flow chart showing the detailed control procedure of step S1 in the flow chart shown in FIG. 3, which shows the control procedure of the control unit 10 according to the second embodiment.

As described above, according to the second embodiment, when a stop state of the vehicle 1 is detected by the process (step S1 in FIG. 3) shown in the flow chart of FIG. 4, the control unit 10 mounted on the vehicle 1 transmits the air pressure detected by the air pressure sensors 6 to 9 to the gas station 100 via wireless communications (step S2 in FIG. 3).

In response to this wireless transmission, the display module 100*b* of the gas station 100 displays the air pressure received from the control unit 10. In this way, the air pressure can be provided even to the user of the vehicle 1, which does not comprise any informing means for acoustically and/or visually informing the air pressure information, as shown in the system arrangement of FIG. 2, at a more appropriate timing than in the first embodiment.

Third Embodiment

Figure 5:
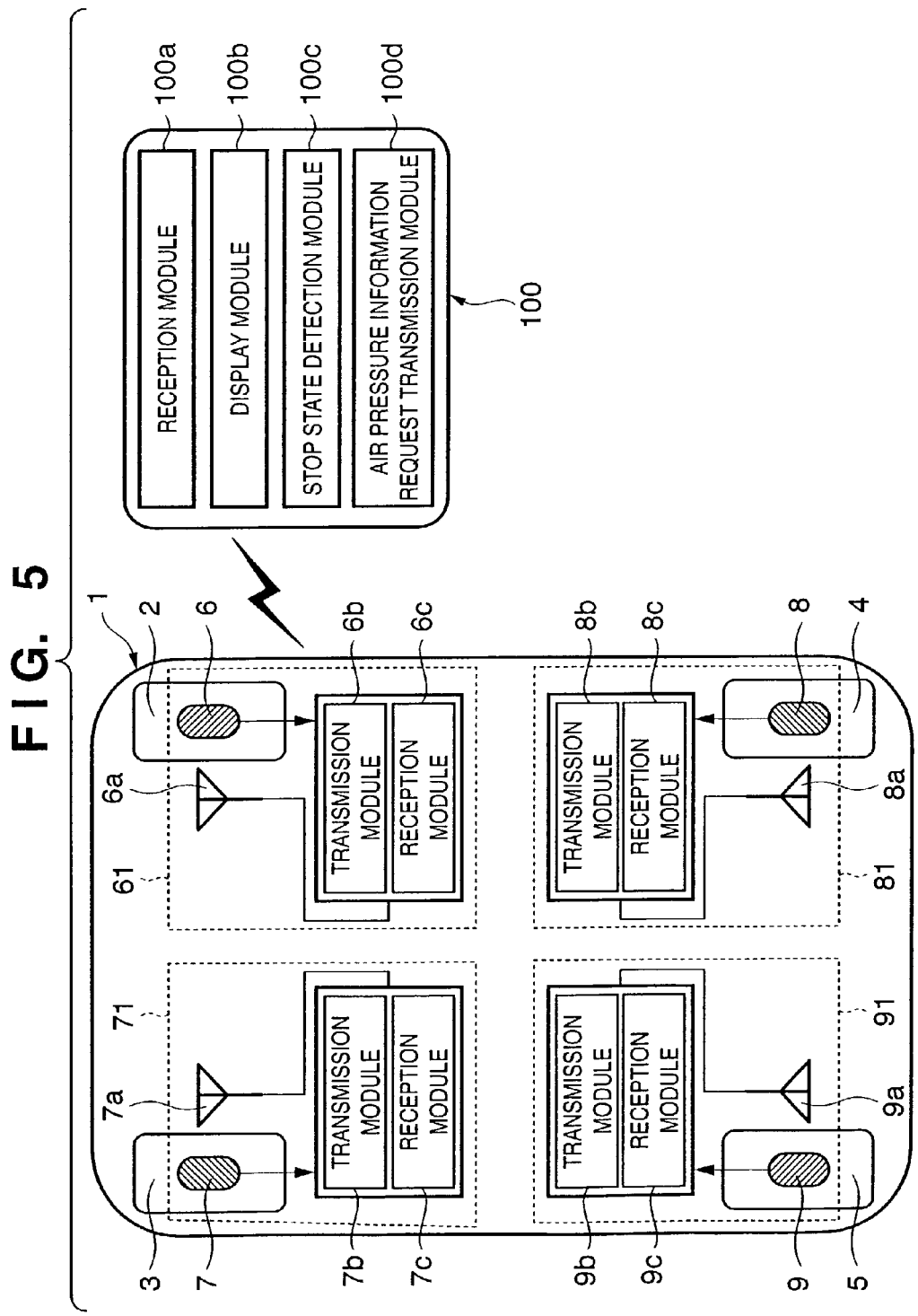
FIG. 5 is a view showing the overall arrangement of an air pressure display system of a vehicle tire according to the third embodiment.

FIG. 5 shows the overall arrangement of an air pressure display system of a vehicle tire according to the third embodiment. Referring to FIG. 5, a vehicle 1 has tires 2 to 5, which respectively comprise air pressure sensor units 61, 71, 81, and 91.

The air pressure sensor units 61, 71, 81, and 91 respectively comprise air pressure sensors 6 to 9, antennas 6*a* to 9*a*, transmission modules 6*b* to 9*b* (corresponding to the transmitters 6*b* to 9*b* in the first and second embodiments) for transmitting the air pressure and tire temperature detected by the air pressure sensors to a gas station 100 as a specific facility (to be described later), and reception modules 6*c* to 9*c* for receiving an air pressure information transmission request signal from the gas station 100.

In this embodiment as well, the air pressure sensors 6 to 9 can detect not only the air pressure but also the tire temperature.

The gas station (i.e., an informing unit installed in the specific facility) 100 is comprised of:

a reception module 100*a* for receiving the air pressure and tire temperature detected by the air pressure sensor unit 61, 71, 81, and 91;

a display module (display unit) 100*b* for numerically displaying the air pressure received by the reception module 100*a* on a display;

a stop state detection module 100*c* for detecting the stop state of the vehicle; and an air pressure information request transmission module 100*d* for transmitting an air pressure information transmission request signal to the vehicle 1 via a wireless communication.

The detailed control procedure according to the third embodiment will be described below with reference to the flow charts of FIGS. 6 and 7.

Figure 6:
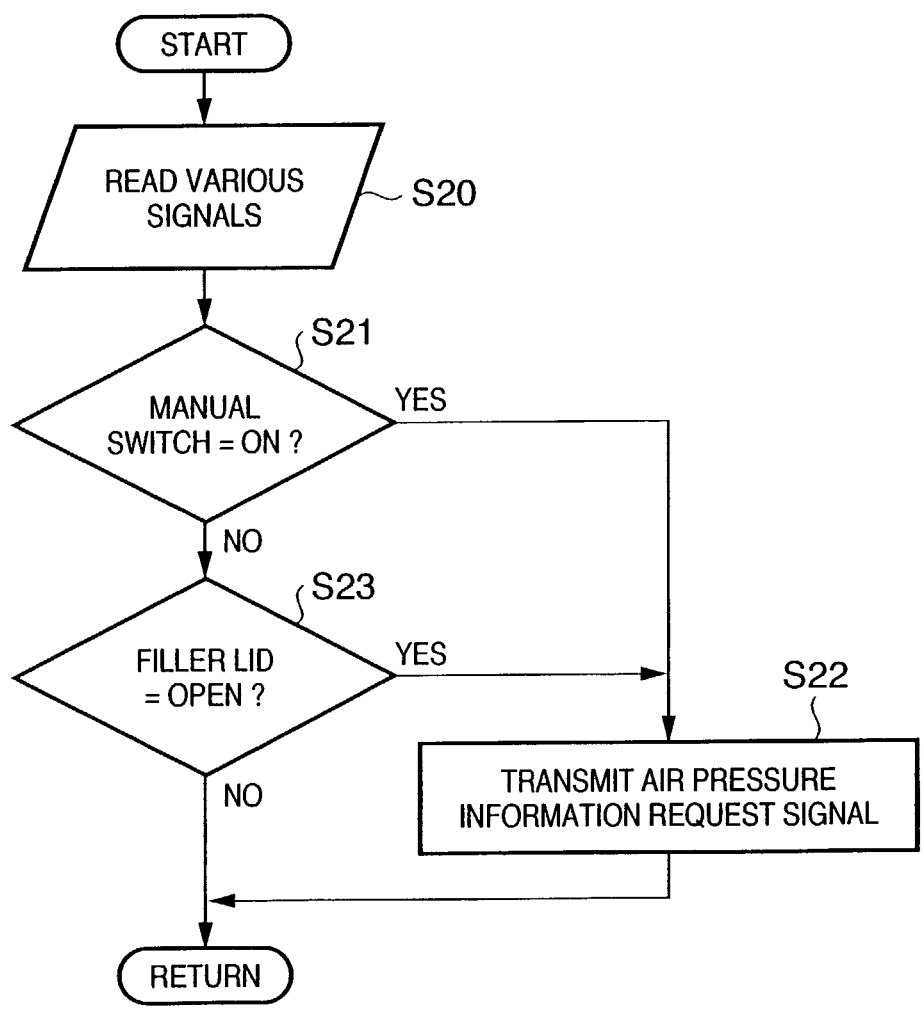
FIG. 6 is a flow chart showing the control procedure on the side of a gas station 100 according to the third embodiment.

FIG. 6 is a flow chart showing the control procedure on the gas station 100 side according to the third embodiment, and shows a process for transmitting an air pressure information transmission request signal from the gas station 100 side to the vehicle 1.

In step S20, various signals indicating the state of a manual switch which is equipped in the gas station 100 and is used to identify the vehicle stop state, the state of a filler switch used to detect the open/close state of a filler cap (neither are shown), and the like are read.

It is checked in step S21 if the manual switch is ON. This manual switch is equipped in the gas station 100, and can be arbitrarily operated by the user or a service person of the gas station 100 to identify the fueling state.

If YES in step S21, since it is determined that the vehicle 1 is being fueled, and is making a stop, the flow advances to step S22 to transmit the air pressure information transmission request signal to the air pressure sensor units 61, 71, 81, and 91 of the vehicle 1 via a wireless communication.

If NO in step S21, the flow advances to step S23 to check if the filler cap is open.

If YES in step S23, since it is determined that the vehicle 1 is making a stop for fueling, the flow advances to step S22 to transmit the air pressure information transmission request signal to the air pressure sensor units 61, 71, 81, and 91 of the vehicle 1 via a wireless communication.

If YES in either step S21 or S23, since it is determined that the vehicle 1 is being fueled, and is making a stop, the air pressure information transmission request signal is transmitted to the air pressure sensor units 61, 71, 81, and 91 of the vehicle 1 via a wireless communication in step S22.

If NO in both steps S21 and S23, the control returns without transmitting any air pressure information transmission request signal.

Figure 7:
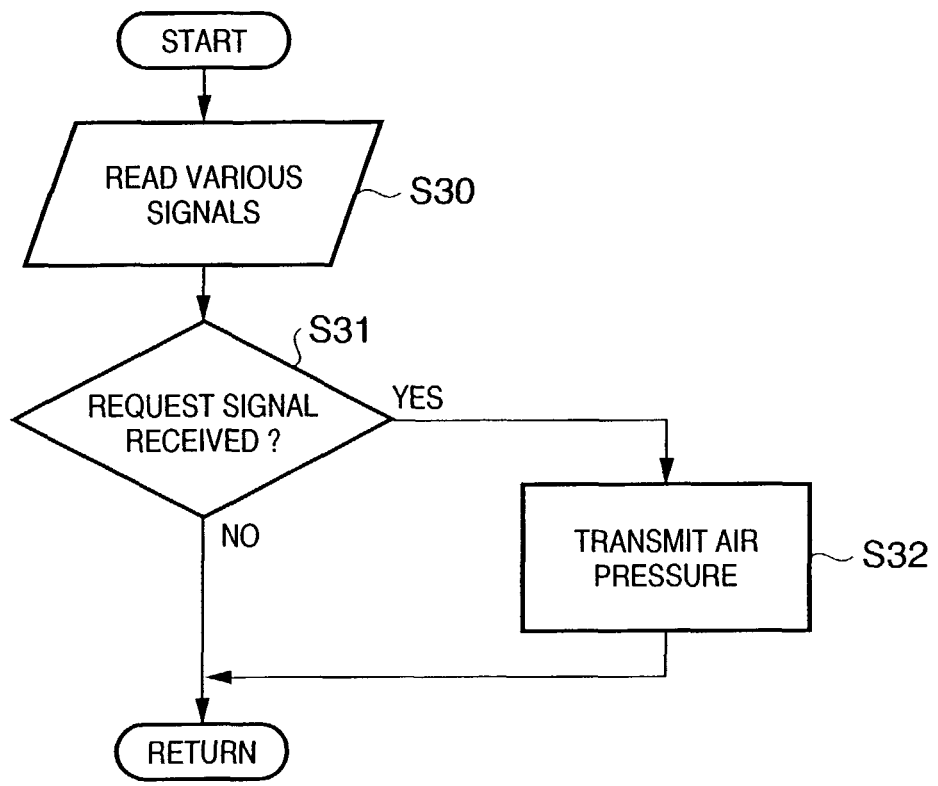
FIG. 7 is a flow chart showing the control procedure of air pressure sensor units 61, 71, 81, and 91 according to the third embodiment.

FIG. 7 is a flow chart showing the control procedure of the air pressure sensor units 61, 71, 81, and 91 according to the third embodiment, and shows a process for transmitting the air pressure detected by the corresponding air pressure sensors (6 to 9) to the gas station 100 via a wireless communication upon receiving the air pressure information transmission request signal from the gas station 100.

In step S30, the air pressure information transmission request signal from the gas station 100 is read.

It is checked in step S31 if the air pressure information transmission request signal is received in step S30. If YES in step S31, the detected air pressure is transmitted to the gas station 100 via a wireless communication in step S32.

If NO in step S31, the control returns without transmitting any air pressure.

According to the third embodiment with the aforementioned processing arrangement, upon receiving the air pressure information transmission request signal from the gas station 100, the air pressure sensor units 61, 71, 81, and 91 mounted on the vehicle 1 transmit the air pressure detected by the corresponding air pressure sensors (6 to 9) to the gas station 100, thus improving reliability of air pressure information exchange.

In the gas station 100, the air pressure information transmission request signal is transmitted in response to detection of the stop state of the vehicle 1, and the air pressure, which is received in response to that air pressure information transmission request signal, is displayed by the display module 100*b* of the informing unit 100 installed in the specific facility such as a gas station. For this reason, the air pressure can be provided even to the user of the vehicle 1, which does not comprise a control unit for informing an air pressure and informing means for acoustically and/or visually informing the air pressure information, as shown in the system arrangement of FIG. 5, at a more appropriate timing than in the first embodiment.

Fourth Embodiment

Figure 8:
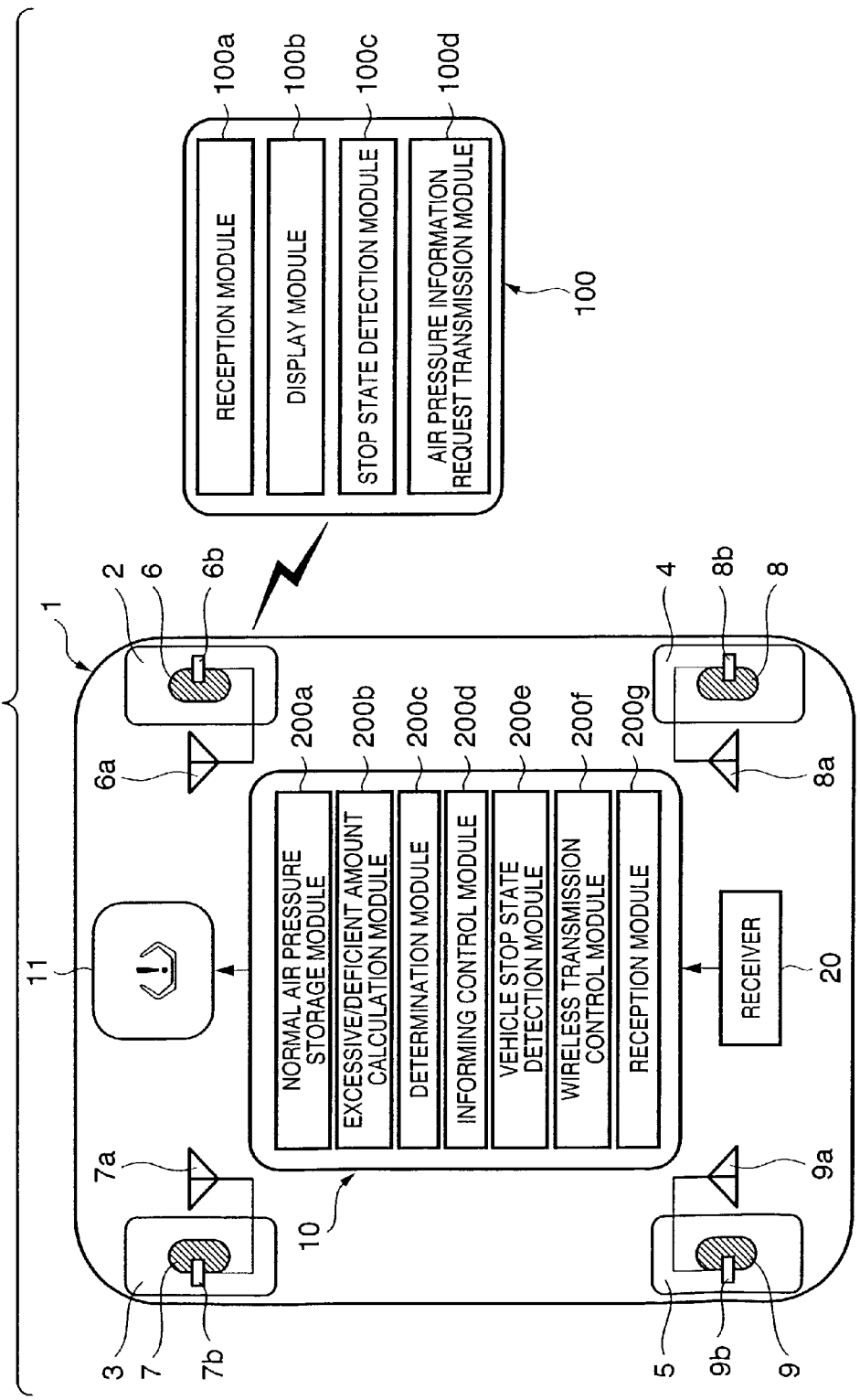
FIG. 8 is a view showing the overall arrangement of an air pressure display system of a vehicle tire according to the fourth and fifth embodiments.

FIG. 8 shows the overall arrangement of an air pressure display system of a vehicle tire according to the fourth and fifth embodiments. Referring to FIG. 8, a vehicle 1 has tires 2 to 5, which respectively comprise air pressure sensors 6 to 9. In addition, in this embodiment, the vehicle 1 itself comprises an informing unit for visually and/or acoustically informing the passenger (user) of information associated with the tire air pressure.

The air pressure sensors 6 to 9 respectively form sensor units which comprise transmitters 6*b* to 9*b* and antennas 6*a* to 9*a*, and the air pressure (measured air pressure) and tire temperature detected by the air pressure sensors are transmitted to a control unit 10 mounted on the vehicle 1 or an informing unit 100 installed in a specific facility (e.g., gas station) via wireless communications.

The control unit 10 implements functions of respective modules to be described below by executing operation instructions of a software program, which is prepared in advance to display air pressure information of the vehicle tire on the vehicle 1, and to externally output it, using a CPU (central processing unit; not shown).

Note that the modules are predetermined function units implemented by the software program and hardware, and the control unit 10 shown in FIG. 8 is comprised of:

a normal air pressure storage module 200a for storing a normal air pressure corresponding to a tire temperature;

an excessive/deficient amount calculation module 200b for calculating an excessive/deficient amount on the basis of the difference between the air pressure detected by the air pressure sensors 6 to 9 and the normal air pressure stored in the normal air pressure storage module 200a;

a determination module 200c for determining the tire air pressure state on the basis of the excessive/deficient amount calculated by the excessive/deficient amount calculation module 200b;

an informing control module 200d for, when the determination module 200c determines an abnormal state of the tire air pressure, outputting the abnormal state of the tire air pressure to an informing module 11 and informing it in a predetermined mode;

a stop state detection module 200e for detecting a stop state of the vehicle 1;

a wireless transmission control module 200f for, when the stop state detection module 200e detects the vehicle stop state, transmitting information associated with the air pressure detected by the air pressure sensors 6 to 9 or the excessive/deficient amount calculated by the excessive/deficient amount calculation module 200b to a gas station 100 via a wireless communication; and a reception module 200g for receiving an air pressure information request signal from the gas station 100.

Also, a receiver 20 which receives radio signals sent from the antennas 6a to 9a of the air pressure sensors 6 to 9 and demodulates them to information in a format that the control unit 10 can read is connected to the control unit 10.

Note that the informing module 11 is provided to, e.g., an instrument panel, and comprises a warning lamp, warning buzzer, or the like that simply informs the abnormal state in place of displaying practical numerical values of the air pressure.

On the other hand, the gas station (i.e., the informing unit installed in the specific facility) 100 comprises:

a reception module 100a for receiving the air pressure and tire temperature detected by the air pressure sensors 6 to 9;

a display module (display unit) 100b for numerically displaying the air pressure received by the reception module 100a on a display; and an air pressure information request transmission module 100d for transmitting an air pressure information transmission request signal to the vehicle 1 via a wireless communication.

The detailed control procedure of the gas station 100 and informing control unit 10 according to the fourth embodiment will be described below with reference to the flow chart of FIG. 9.

Note that the transmission process of an air pressure information transmission request signal on the gas station 100 side is the same as that in the aforementioned third embodiment (FIG. 6), and a description thereof will be omitted.

The process on the informing control unit 10 side will be explained below with reference to FIG. 9.

Figure 9:
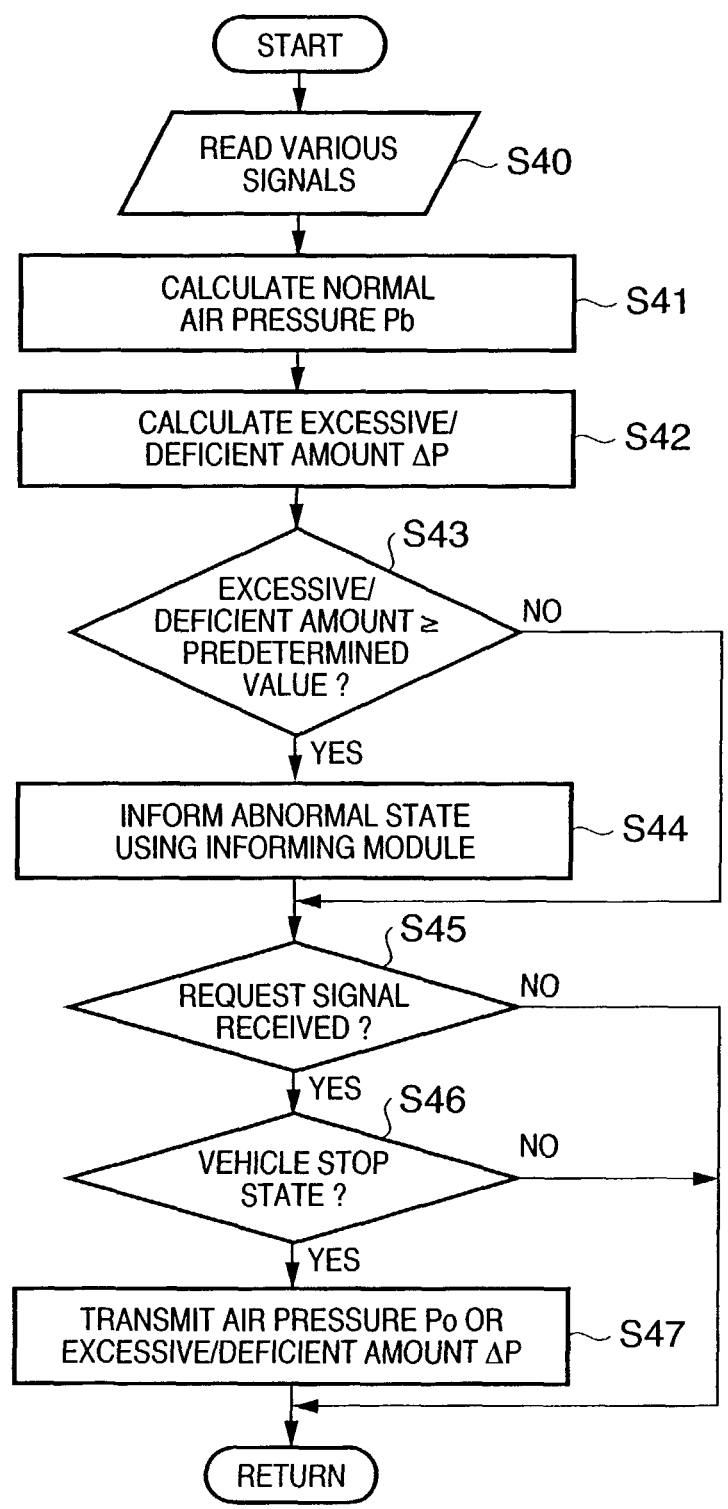
FIG. 9 is a flow chart showing the control procedure of a control unit 10 according to the fourth embodiment.

In step S40 in FIG. 9, various signals of the air pressure sensors 6 to 9, and the like are read. In step S41, a normal air pressure Pb corresponding to a current tire temperature T is calculated on the basis of a map that pre-stores normal air pressures Pb corresponding to tire temperatures T.

In step S42, an excessive/deficient amount $\Delta P$ is calculated on the basis of the difference between the actual normal air pressure (measured air pressure) Po read in step S40, and the normal tire air pressure Pb calculated in step S41.

It is checked in step S43 if the excessive/deficient amount $\Delta P$ calculated in step S42 is equal to or larger than a predetermined value, i.e., if the tire air pressure state largely deviates from the normal air pressure. If YES in step S43, the flow advances to step S44 to control the informing module 11 equipped in the vehicle 1 to inform that tire air pressure state.

On the other hand, if NO in step S43, the flow jumps to step S45 without any process in step S44.

It is checked in step S45 if an air pressure information transmission request signal is received from the gas station 100. If YES in step S45, the flow advances to step S46 to check if the vehicle is making a stop.

Since the details of the checking step S46 are the same as those of the process explained in the second embodiment with reference to FIG. 4, a description thereof will be omitted.

If YES in step S46, i.e., if the air pressure information transmission request signal is received from the gas station 100 as the specific facility, and the vehicle stop state is detected, the air pressure Po detected by the air pressure sensors 6 to 9 or the excessive/deficient amount $\Delta P$ calculated by the excessive/deficient amount calculation module 200b is transmitted to the gas station 100 via a wireless communication.

According to the fourth embodiment with the above arrangement, the informing module 11 in the vehicle 1 simply informs if the tire air pressure state is normal or abnormal. Hence, no expensive display for numerically displaying the air pressure need be provided to the vehicle, and an increase in cost of the vehicle 1 can be suppressed.

In this embodiment, the user can recognize the necessity of air pressure adjustment of the vehicle 1 upon receiving the information from the informing module 11. Then, the user adjusts the air pressures of the tires 2 to 5 mounted on the vehicle 1 in a nearby specific facility such as a gas station 100 or the like. In this case, in such specific facility, the display module 100b displays air pressure information as detailed numerical values. Hence, even when the informing module 11 of the vehicle 1 comprises only a warning lamp which simply informs only an abnormal state in place of a display for numerically displaying the air pressure and the like, detailed tire air pressure information can be provided to the user of such vehicle 1.

Fifth Embodiment

FIGS. 10 and 11 show the specifications of transmission signals according to the fifth embodiment.

In this embodiment, transmission signals exchanged between the air pressure sensors 6 to 9 (sensor units) and informing control unit 10 have a signal specification that contains unique identification information, which is used to identify the self vehicle from other vehicles. On the other hand, transmission signals exchanged between the informing control unit 10 and gas station 100 have a common signal specification irrespective of the self vehicle and other vehicles.

More specifically, a transmission signal transmitted from the air pressure sensors 6 to 9 to the informing control unit 10 contains unique identification information used to identify the self vehicle from other vehicles (e.g., information indicating a vehicle model name) in addition to transmission start information and a data field, as shown in FIG. 10.

By contrast, a transmission signal exchanged between the air pressure sensors 6 to 9 or informing control unit 10, and the gas station 100 has a common signal specification irrespective of the self vehicle and other vehicles, as shown in FIG. 11.

According to the fifth embodiment that uses the aforementioned transmission signals, since the transmission signal, which is transmitted from the air pressure sensors 6 to 9 or informing control unit 10 to the gas station 100 via a wireless communication, contains unique identification information used to identify the vehicle which transmitted that signal by radio, the informing control unit 10 of the self vehicle can be prevented from erroneously receiving air pressure information from another vehicle as that of the self vehicle.

Also, since the transmission signal, which is transmitted from the informing control unit 10 to the gas station via a wireless communication, is set to have a common specification irrespective of the self vehicle and other vehicles, the load on the reception process in the specific facility such as the gas station 100 or the like can be reduced.

Sixth Embodiment

Figure 12:
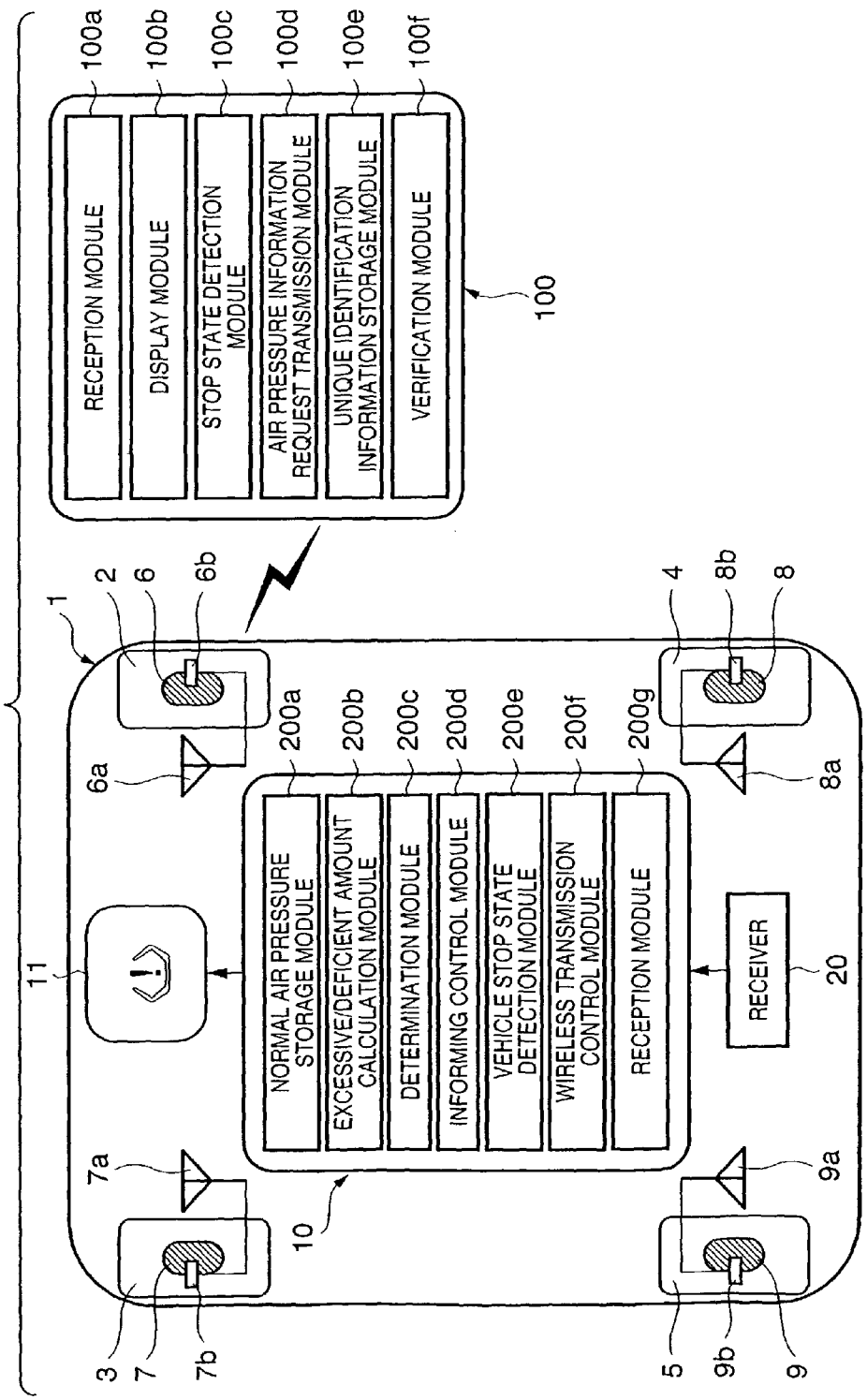
FIG. 12 is a view showing the overall arrangement of an air pressure display system of a vehicle tire according to the sixth embodiment.

FIG. 12 shows the overall arrangement of an air pressure display system of a vehicle tire according to the sixth and seventh embodiments. Referring to FIG. 12, a vehicle 1 has tires 2 to 5, which respectively comprise air pressure sensors 6 to 9. In addition, in this embodiment, the vehicle 1 itself comprises an informing unit for visually and/or acoustically informing the driver (user) of information associated with the tire air pressure.

The air pressure sensors 6 to 9 respectively form sensor units which comprise transmitters 6b to 9b and antennas 6a to 9a, and the air pressure (measured air pressure) and tire temperature detected by the air pressure sensors are transmitted to a control unit 10 mounted on the vehicle 1 or an informing unit 100 installed in a specific facility (e.g., gas station) via wireless communications.

The control unit 10 implements functions of respective modules to be described below by executing operation instructions of a software program, which is prepared in advance to display air pressure information of the vehicle tire on the vehicle 1, and to externally output it, using a CPU (central processing unit; not shown).

The control unit 10 implements functions of respective modules to be described below by executing operation instructions of a software program, which is prepared in advance to display air pressure information of the vehicle tire on the vehicle 1, and to externally output it, using a CPU (central processing unit; not shown).

Note that the modules are predetermined function units implemented by the software program and hardware, and the control unit 10 shown in FIG. 12 is comprised of:
  a normal air pressure storage module 200a for storing a normal air pressure corresponding to a tire temperature;
  an excessive/deficient amount calculation module 200b for calculating an excessive/deficient amount on the basis of the difference between the air pressure detected by the air pressure sensors 6 to 9 and the normal air pressure stored in the normal air pressure storage module 200a;
  a determination module 200c for determining the tire air pressure state on the basis of the excessive/deficient amount calculated by the excessive/deficient amount calculation module 200b;
  an informing control module 200d for, when the determination module 200c determines an abnormal state of the tire air pressure, outputting the abnormal state of the tire air pressure to an informing module 11 and informing it in a predetermined mode;
  a stop state detection module 200e for detecting a stop state of the vehicle 1;
  a wireless transmission control module 200f for, when the stop state detection module 200e detects the vehicle stop state, transmitting information associated with the air pressure detected by the air pressure sensors 6 to 9 or the excessive/deficient amount calculated by the excessive/deficient amount calculation module 200b to a gas station 100 via a wireless communication; and
  a reception module 200g for receiving an air pressure information request signal from the gas station 100.

Also, a receiver 20 which receives radio signals sent from the antennas 6a to 9a of the air pressure sensors 6 to 9 and demodulates them to information in a format that the control unit 10 can read is connected to the control unit 10.

Note that the informing module 11 is provided to, e.g., an instrument panel, and comprises a warning lamp, warning buzzer, or the like that simply informs the abnormal state in place of displaying practical numerical values of the air pressure.

On the other hand, the gas station (i.e., the informing unit installed in the specific facility) 100 comprises:
  a reception module 100a for receiving the air pressure and tire temperature detected by the air pressure sensors 6 to 9;
  a display module (display unit) 100b for numerically displaying the air pressure received by the reception module 100a on a display;
  a stop state detection module 100c for detecting a stop state of the vehicle 1;
  an air pressure information request transmission module 100d for transmitting an air pressure information transmission request signal to the vehicle 1 via a wireless communication;
  a unique identification information storage module 100e for storing unique identification information; and
  a verification module 100f for comparing the unique identification information contained in a transmission signal, which is transmitted from the air pressure sensors 6 to 9 or informing control unit 10 via a wireless communication, with the unique identification information stored in the unique identification information storage module 100e.

In the sixth embodiment, the gas station 100 comprises the unique identification information storage module 100e for storing unique identification information. However, the unique identification information storage module 100e need not always be provided to the informing unit 100 on the gas station, but may be provided to an external information center. In such case, the unique identification information can be provided from the information center to the gas station 100 via the Internet or the like.

The detailed control procedure of the gas station 100 according to the sixth embodiment will be described below with reference to the flow chart in FIG. 13.

Figure 13:
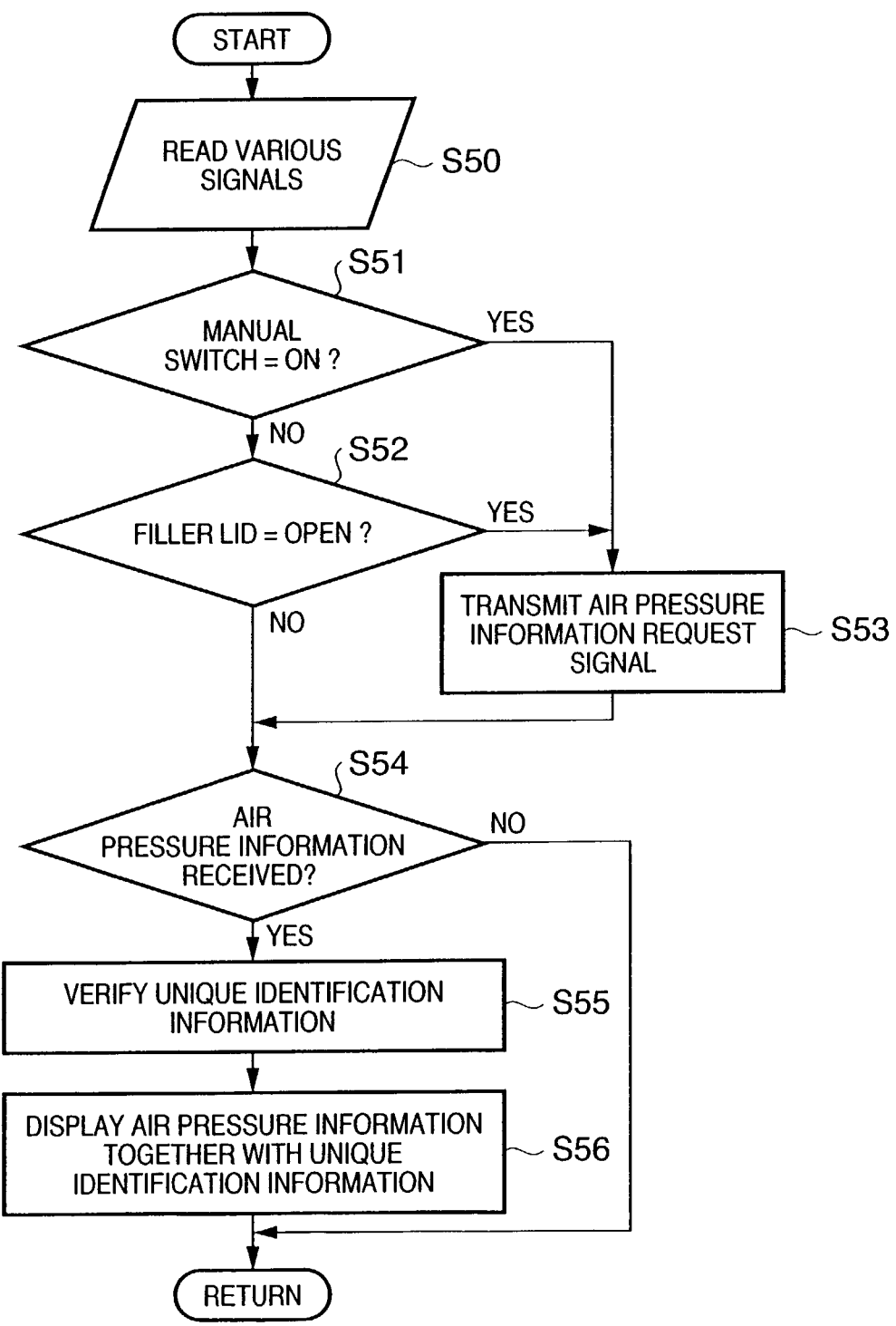
FIG. 13 is a flow chart showing the control procedure on the side of a gas station 100 according to the sixth embodiment.

In step S50 in FIG. 13, the state of a manual switch, which is equipped in the gas station 100 to identify the vehicle stop state, the state of a filler switch used to detect the open/close state of a filler cap (filler lid; neither are shown), and air pressure information, which is transmitted from the air pressure sensor 6 to 9 or informing control unit 10 via a wireless communication, are read.

The fueling/non-fueling state of the vehicle 1 is checked in steps S51 and S52. If a fueling state is determined in either step S51 or S52, an air pressure information transmission request signal is transmitted to the vehicle 1 via a wireless communication in step S53.

It is checked in step S54 if air pressure information is received from the air pressure sensor 6 to 9 or informing control unit 10. If YES in step S54, the unique identification information stored in the unique identification information storage module 100e is compared with that which is contained in the air pressure information or information associated with the excessive/deficient amount transmitted from the vehicle 1, in step S55.

Note that the unique identification information includes, for example, a license plate number, vehicle model name, member information registered in the gas station 100, or the like.

In step S56, the unique identification information verified in step S55 is displayed by the display module 100b of the gas station 100 together with the air pressure information or information associated with the excessive/deficient amount transmitted from the vehicle 1.

Figure 14:
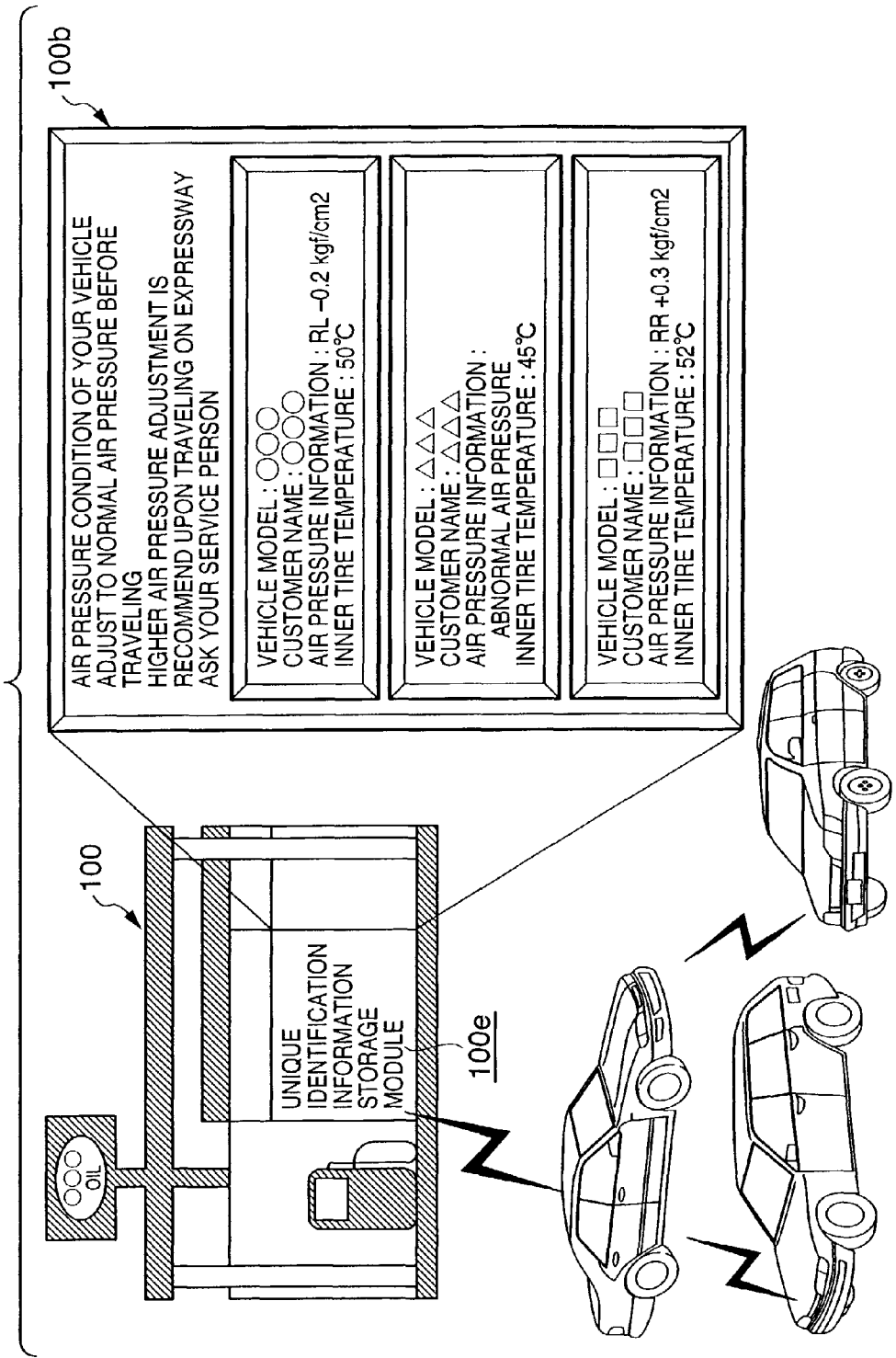
FIG. 14 shows a display example of a display module 100b of the gas station 100 in the sixth embodiment.

As described above, according to the sixth embodiment, since the unique identification information and air pressure information of each vehicle are displayed together by the display module 100b of the gas station 100, as shown in, e.g., FIG. 14, the user can normally recognize correspondence between the air pressure information and the vehicle which transmitted that air pressure information by radio.

Seventh Embodiment

Figure 15:
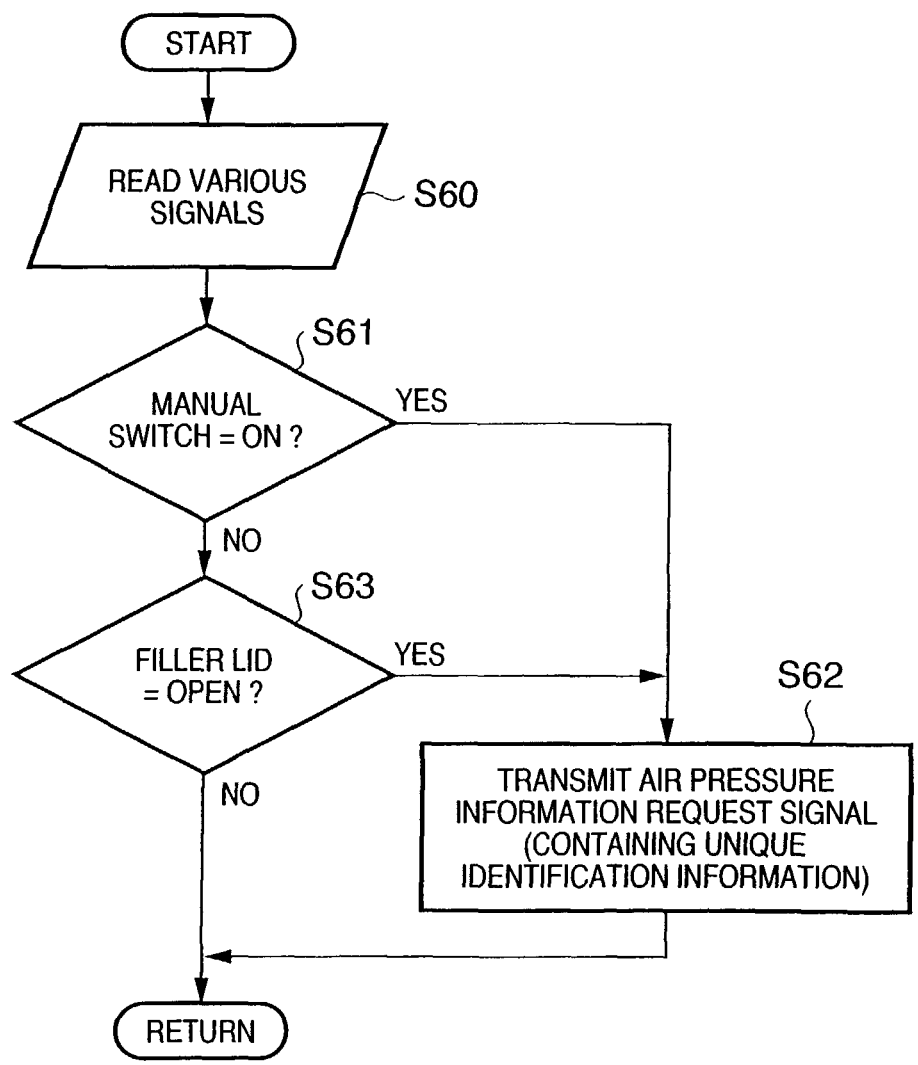
FIG. 15 is a flow chart showing the control procedure on the side of a gas station 100 according to the seventh embodiment.
Figure 16:
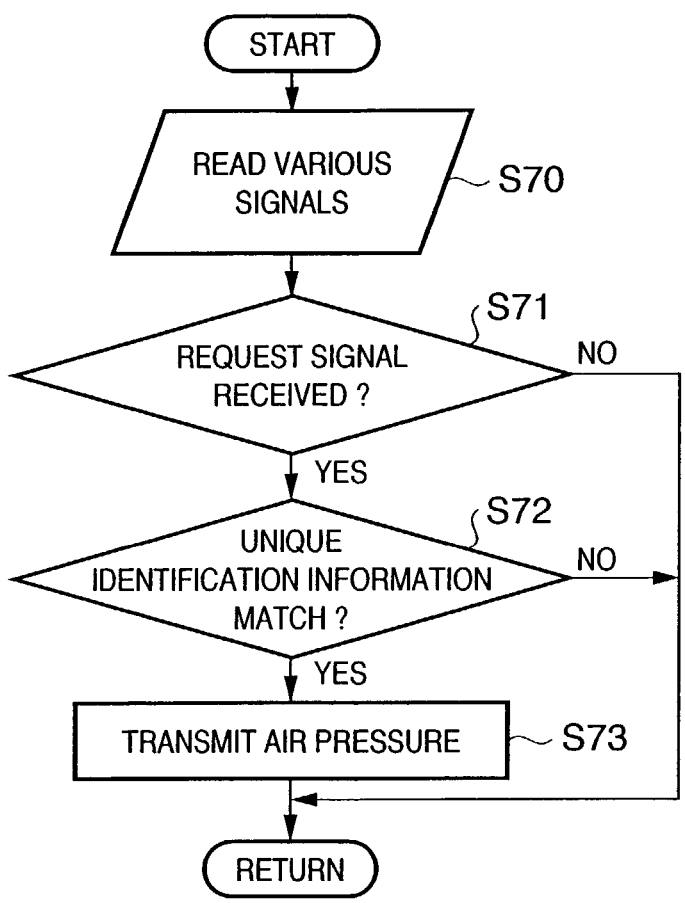
FIG. 16 is a flow chart showing the control procedure of a control unit 10 according to the seventh embodiment.

FIG. 15 is a flow chart showing the control procedure on the gas station 100 according to the seventh embodiment, and FIG. 16 is a flow chart showing the control procedure of the control unit 10 according to the seventh embodiment.

In the seventh embodiment, using the same system arrangement as that of the sixth embodiment (FIG. 12), an air pressure information request signal, which is transmitted from the informing unit 100 on the gas station side to the vehicle 1 via a wireless communication, contains unique identification information. In the vehicle 1, the control unit 10 compares the unique identification information received from the informing unit 100 with that of the self vehicle. When the received unique identification information matches with that of the self vehicle as a result of comparison, the control unit 10 transmits air pressure information detected by the air pressure sensors 6 to 9 to the gas station 100.

More specifically, FIG. 15 shows the process for transmitting an air pressure information transmission request signal from the gas station 100 via a wireless communication. In FIG. 15, steps S60 to S63 are basically the same as those in the third embodiment (FIG. 6), except that the signal specification of the air pressure information transmission request signal contains unique identification information used to identify a vehicle in step S62.

FIG. 16 shows the process for transmitting air pressure information from the informing control unit 10 to the gas station 100.

In step S70, an air pressure information transmission request signal from the gas station 100 is read. It is checked in step S71 if the air pressure information transmission request signal is received.

If YES in step S71, the flow advances to step S72 to check if unique identification information contained in the received air pressure information transmission request signal matches that of the self vehicle.

If YES in step S72, since it is determined that the gas station 100 requests air pressure information of the self vehicle, air pressure information corresponding to the detection result acquired from the air pressure sensors 6 to 9 via the receiver 20 is transmitted to the gas station 100 via a wireless communication in step S73.

According to the seventh embodiment with the aforementioned processing arrangement, when unique identification information contained in the air pressure information transmission request signal received from the gas station 100 matches that of the self vehicle, the informing control unit 10 of the vehicle 1 transmits air pressure information to the gas station 100 via a wireless communication, thus improving the reliability upon exchanging the air pressure information.

In this embodiment, the gas station has been exemplified as the specific facility 100. In addition, a repair factory, dealer, service area of an expressway, and the like may be used.

According to the aforementioned embodiments, since information that represents the tire air pressure information detected by the vehicle 1 is displayed on the informing unit 100 installed in a specific facility such as a gas station or the like, the air pressure information can be specifically provided to the user of the vehicle 1, which does not comprise any display that can display air pressure information in a detailed display mode.

As many apparently widely different embodiments of the present invention can be made without departing from the spirit and scope thereof, it is to be understood that the invention is not limited to the specific embodiments thereof except as defined in the claims.

What is claimed is:

1. An air pressure information display system of a vehicle tire, wherein the system comprises:
a vehicle comprising air pressure information detection means for detecting an air pressure of a vehicle tire, and transmitting the detected tire air pressure via a wireless communication;
a specific facility which can receive the tire air pressure information detected by said air pressure information detection means comprising display means for displaying the received air pressure information; and
said vehicle further comprising
vehicle stop state detection means for detecting a stop state of the vehicle, and
wireless transmission control means for, when said vehicle stop state detection means detects the stop state of the vehicle, transmitting the air pressure information detected by said air pressure information detection means to the specific facility.

2. The system according to claim 1, wherein said vehicle stop state detection means detects the stop state of the vehicle when fueling detection means for detecting a fueling state of the vehicle detects that fueling is in progress.

3. The system according to claim 1, wherein said vehicle stop state detection means detects the stop state of the vehicle when a change amount of the air pressure detected by said air pressure information detection means is detected, and a change in air pressure not less than a predetermined value is detected on the basis of the detected change amount.

4. An air pressure information display system of a vehicle tire, wherein the system comprises:

a vehicle comprising air pressure information detection means for detecting an air pressure of a vehicle tire, and transmitting the detected tire air pressure via a wireless communication;

a specific facility which can receive the tire air pressure information detected by said air pressure information detection means comprising display means for displaying the received air pressure information, air pressure information request transmission means for transmitting, via a wireless communication, an air pressure information transmission request signal used to require the vehicle to transmit the air pressure information, and stop state detection means for detecting a stop state of the vehicle in the specific facility; and the vehicle further comprising reception means for receiving the air pressure information transmission request signal from said air pressure information request transmission means, and wireless transmission control means for, when said reception means receives the air pressure information transmission request signal from said air pressure information request transmission means, transmitting the air pressure information detected by said air pressure information detection means to the specific facility via a wireless communication, and said air pressure information request transmission means transmits the air pressure information transmission request signal to the vehicle when said stop state detection means detects the stop state of the vehicle.

5. An air pressure information display system of a vehicle tire, the system includes a vehicle and a specific facility, wherein, the vehicle comprises:

air pressure information detection means for detecting an air pressure of a vehicle tire, and transmitting the detected tire air pressure via a wireless communication, informing means for informing an air pressure state of the vehicle tire; and an informing control unit for controlling said informing means to inform the air pressure state of the vehicle tire in the vehicle on the basis of the tire air pressure information received from said air pressure information detection means via a wireless communication, wherein said informing control unit comprises:

normal air pressure storage means for storing a normal air pressure of the vehicle tire;

excessive/deficient amount calculation means for calculating information associated with an excessive/deficient amount of the tire air pressure detected by said air pressure information detection means from the normal air pressure on the basis of a relationship between the normal air pressure stored in said normal air pressure storage means and the tire air pressure information detected by said tire air pressure information detection means;

determination means for determining an air pressure state of the tire on the basis of the information associated with the excessive/deficient amount calculated by said excessive/deficient amount calculation means;

informing control means for controlling said informing means to inform the tire air pressure state determined by said determination means in a predetermined mode; and wireless transmission means for transmitting the air pressure information detected by said air pressure information detection means or the information associated with the excessive/deficient amount calculated by said excessive/deficient amount calculation means to a specific facility that can receive the air pressure information or the information associated with the excessive/deficient amount via a wireless communication, and wherein, the specific facility comprises:

reception means that can receive the air pressure information directly transmitted from said air pressure information detection means via a wireless communication, the air pressure information transmitted via said wireless transmission means, or the information associated with the excessive/deficient amount transmitted by said wireless transmission means via a wireless communication, and display means for displaying the air pressure information or the information associated with the excessive/deficient amount received by said reception means.

6. The system according to claim 5, wherein a signal specification of a transmission signal, which is transmitted from said air pressure information detection means to said informing control unit via a wireless communication, contains unique identification information used to identify a self vehicle from other vehicles, and a transmission signal, which is transmitted from said informing control unit to the specific facility via a wireless communication, has a common signal specification irrespective of the self vehicle and other vehicles.

7. The system according to claim 5, wherein a transmission signal, which is transmitted from said air pressure information detection means or said informing control unit to the specific facility via a wireless communication, contains unique identification information used to identify a vehicle that transmitted the signal via a wireless communication.

8. The system according to claim 7, wherein the specific facility comprises verification means for comparing unique identification information contained in a transmission signal, which is transmitted from said air pressure information detection means or said informing control unit to the specific facility via a wireless communication, with unique identification information pre-stored in the specific facility or obtained from a system outside the specific facility, and said display means displays the unique identification information verified by said verification means together with the air pressure information or the information associated with the excessive/deficient amount received by said reception means.

9. The system according to claim 7, wherein the specific facility comprises unique identification means storage means for storing unique identification information which can identify a vehicle, said air pressure information request transmission means in the specific facility transmits the unique identification information obtained from said unique identification means storage means to the vehicle together with the air pressure information transmission request signal, and said wireless transmission control means in the vehicle transmits the air pressure information to the specific facility via a wireless communication when the unique identification information transmitted from said air pressure information request transmission means via a wireless communication matches unique identification information of the self vehicle.

10. An air pressure information display system of a vehicle tire, the system includes a vehicle and a specific facility, wherein the vehicle comprises:

an air pressure detection sensor unit for detecting an air pressure of a vehicle tire, and transmitting the detected tire air pressure via a wireless communication, and informing unit for informing an air pressure state of the vehicle tire; and an informing control unit for controlling said informing unit to inform the air pressure state of the vehicle tire in the vehicle on the basis of the tire air pressure information received from said air pressure detection sensor unit via a wireless communication, wherein said informing control unit comprises:

normal air pressure storage module for storing a normal air pressure of the vehicle tire;

excessive/deficient amount calculation module for calculating information associated with an excessive/deficient amount of the tire air pressure detected by said air pressure detection sensor unit from the normal air pressure on the basis of a relationship between the normal air pressure stored in said normal air pressure storage module and the tire air pressure information detected by said tire air pressure detection sensor unit;

determination module for determining an air pressure state of the tire on the basis of the information associated with the excessive/deficient amount calculated by said excessive/deficient amount calculation module;

informing control module for controlling said informing module to inform the tire air pressure state determined by said determination module in a predetermined mode; and wireless transmission module for transmitting the air pressure information detected by said air pressure detection sensor unit or the information associated with the excessive/deficient amount calculated by said excessive/deficient amount calculation module to a specific facility that can receive the air pressure information or the information associated with the excessive/deficient amount via a wireless communication, and wherein, the specific facility comprises:

reception module that can receive the air pressure information directly transmitted from said air pressure detection sensor unit via a wireless communication, the air pressure information transmitted via said wireless transmission module, or the information associated with the excessive/deficient amount transmitted by said wireless transmission module via a wireless communication, and a display unit for displaying the air pressure information or the information associated with the excessive/deficient amount received by said reception module.

* * * * *